March 17, 1959 F. E. ALLEN 2,877,670
MULTIPLE SPINDLE APPARATUS WITH RADIAL AXES
Filed July 30, 1956 4 Sheets-Sheet 1
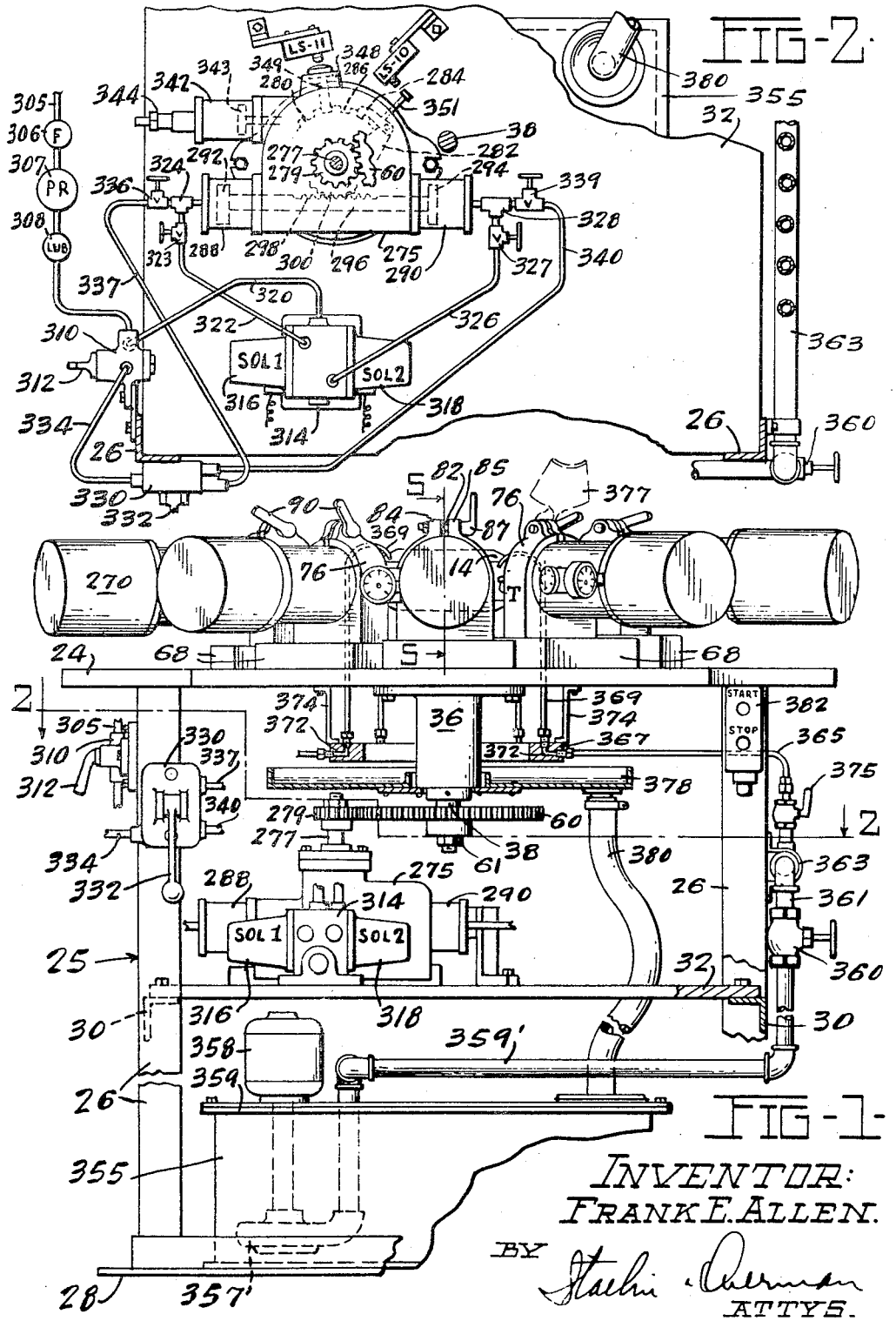
INVENTOR:
FRANK E. ALLEN.
BY
ATTYS.

March 17, 1959 F. E. ALLEN 2,877,670
MULTIPLE SPINDLE APPARATUS WITH RADIAL AXES
Filed July 30, 1956 4 Sheets-Sheet 2
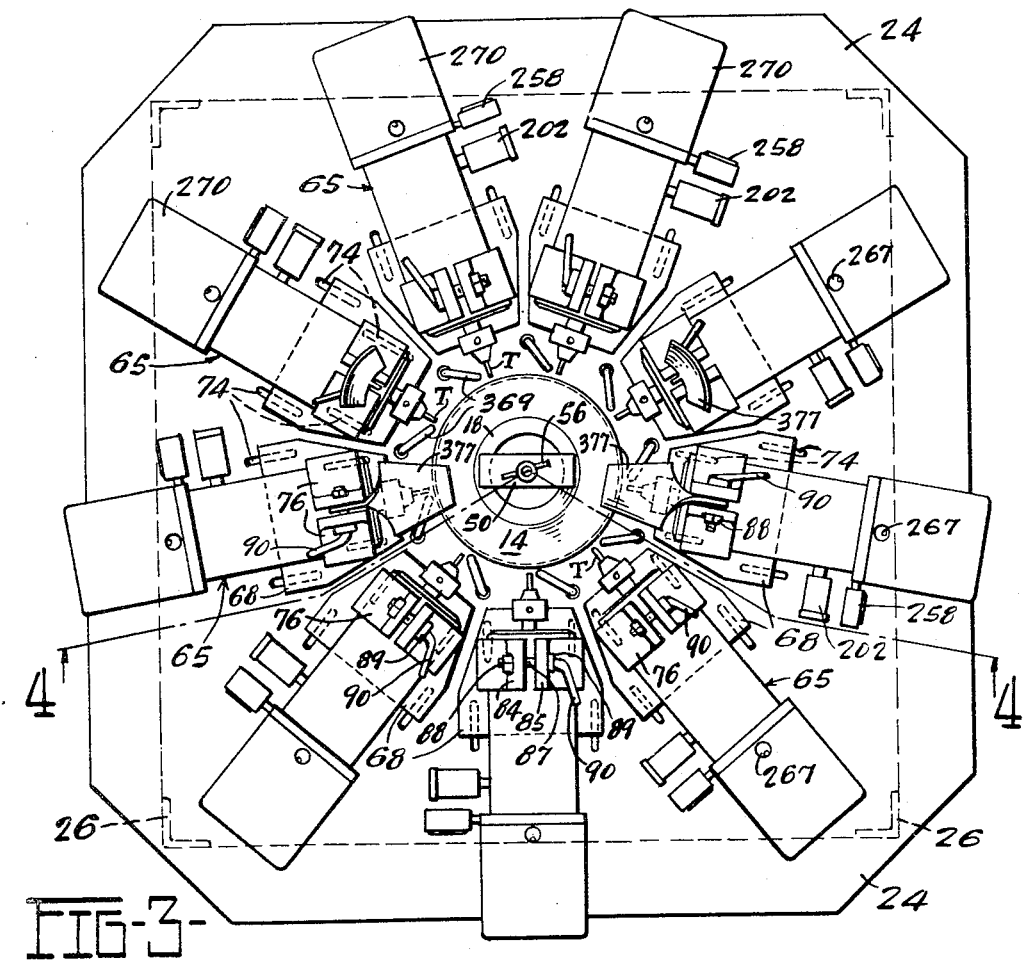
FIG-3-
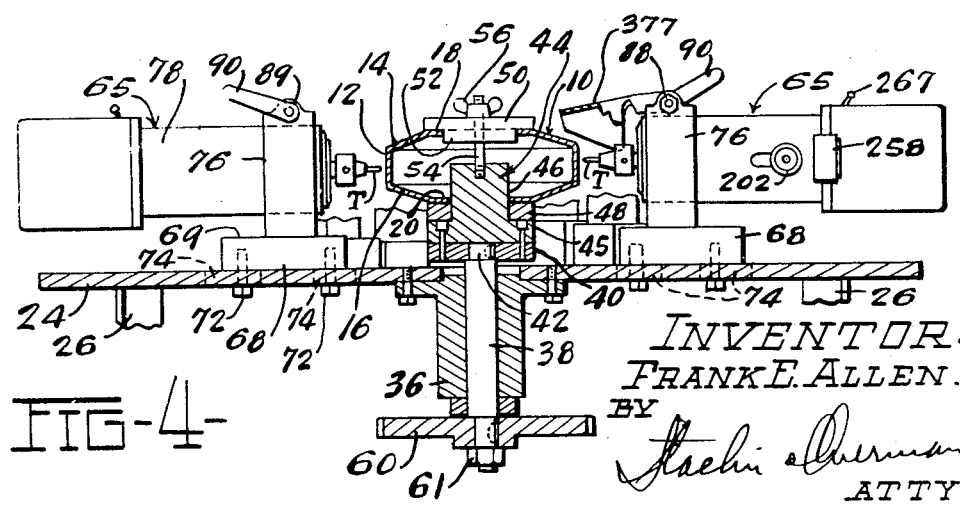
FIG-4-
INVENTOR:
FRANK E. ALLEN.
BY
ATTYS.

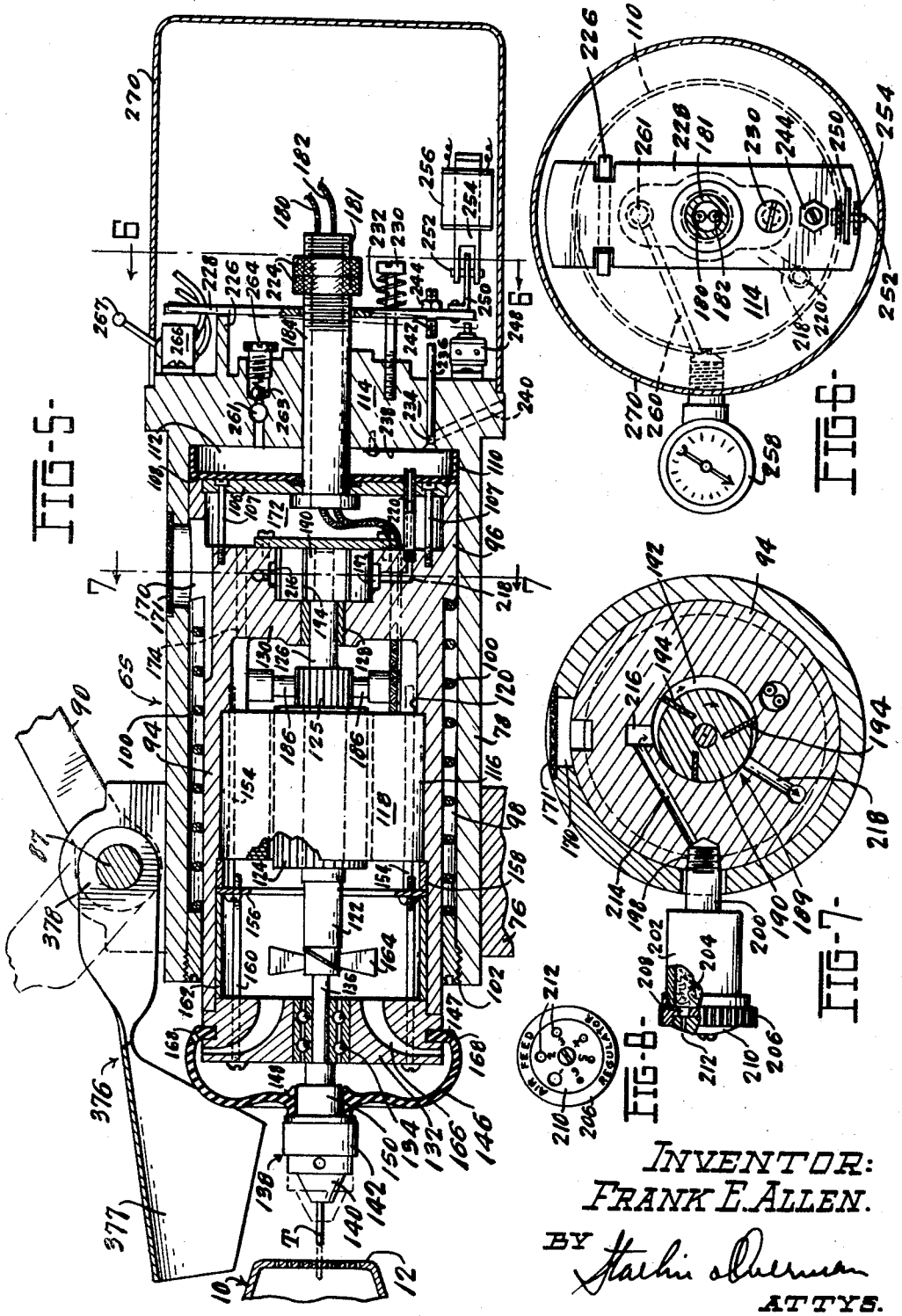

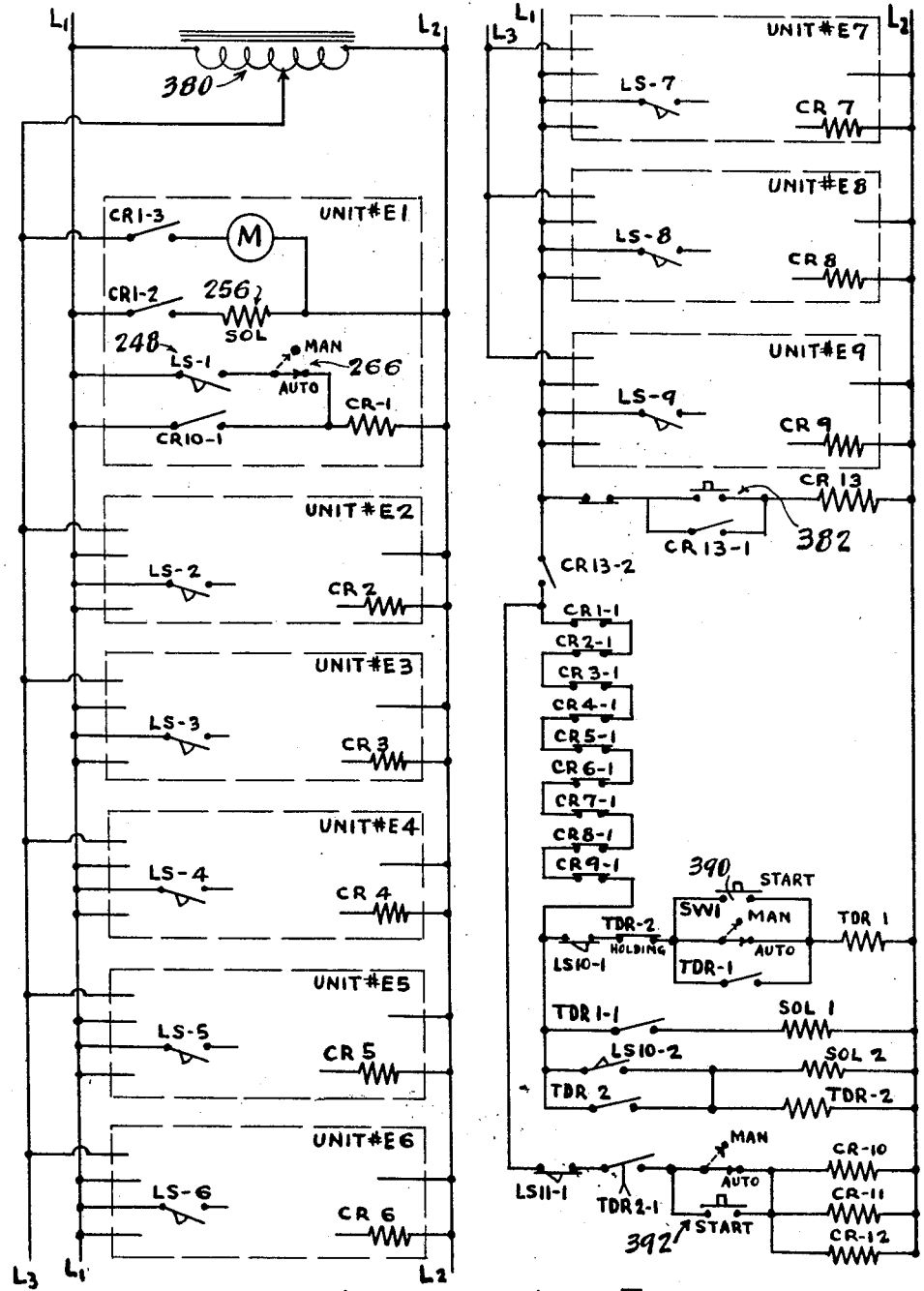

United States Patent Office 2,877,670
Patented Mar. 17, 1959

2,877,670
MULTIPLE SPINDLE APPARATUS WITH RADIAL AXES

Frank E. Allen, Newark, Ohio, assignor to Owens-Corning Fiberglas Corporation, a corporation of Delaware Application July 30, 1956, Serial No. 600,821
3 Claims. (Cl. 77—26)

This invention relates to an apparatus for performing operations upon a work piece and automatically indexing or moving the work piece after the completion of a cycle of work performing operations in preparation for a succeeding cycle of operations to be carried on.

The invention relates more especially to a machine or apparatus embodying a plurality of drilling or work performing units adapted to operate concomitantly to perform drilling or similar operations upon a thin walled work piece such as a spinner or rotor and wherein the operations occur in cycles and the mechanisms for performing operations upon the work being electrically controlled and automatically actuated.

The invention embraces an apparatus for performing or effecting the drilling of comparatively large numbers of small openings or orifices in a rotor wall wherein the openings are arranged in rows and the rows disposed in parallel planes and wherein drilling operations are carried on concomitantly in forming openings in the several rows at each operating cycle.

An object of the invention is the provision of an apparatus embodying a plurality of drilling units adapted to be concomitantly advanced into engagement with a work piece whereby a number of openings are drilled in the work piece at each advancing movement of the drilling units, the arrangement embodying an indexing mechanism for repositioning the work piece after each cycle of drilling operations and electrically energized means and electric controls for initiating the operations of the drilling units and the indexing mechanism whereby successive operations of the mechanisms and drilling units are effected in proper sequence.

Another object of the invention is the provision of electrical means for controlling the operations of multiple drilling units and indexing mechanism wherein an electrical interlock is established in the control circuits whereby the operations of the drilling units must be completed before the work indexing mechanism is actuated to reposition the work piece.

Another object of the invention resides in a coolant or cutting fluid circulating system for the work performing tools wherein the coolant is conveyed to an annular distribution zone and an individual controlled stream of coolant from the annular distribution zone directed onto each work performing tool and the fluid collected for recirculation without loss of the coolant.

Still another object of the invention is the provision of an arrangement for drilling openings at circumferentially spaced regions of a circular member or work piece, the drilling operations being concomitantly effected through a plurality of circumferentially arranged drilling units whereby drilling pressures are substantially uniformly distributed peripherally of the work resulting in improved accuracy of the drilled openings.

Another object of the invention is the provision of an apparatus for drilling or forming a large number of comparatively small openings in a wall of a hollow spinner with a high degree of accuracy and in a minimum length of time.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a side elevational view illustrating a form of the apparatus or machine of the invention;

Figure 2 is a horizontal sectional view taken substantially on the line 2—2 of Figure 1;

Figure 3 is a top plan view of the apparatus shown in Figure 1;

Figure 4 is a vertical sectional view taken substantially on the line 4—4 of Figure 3;

Figure 5 is a vertical sectional view through one of the work performing or drilling units, the view being taken substantially on the line 5—5 of Figure 1;

Figure 6 is a detail sectional view taken substantially on the line 6—6 of Figure 5;

Figure 7 is a detail sectional view taken substantially on the line 7—7 of Figure 5;

Figure 8 is an end view of a fluid metering means forming a component of the appartus, and Figure 9 is a schematic view illustrating the electrical control mechanisms for components of the apparatus and circuits therefor.

The apparatus or machine of the invention is especially adapted for drilling multiple rows of small openings in the periphery of a hollow thin walled element, but it is to be understood that the apparatus may be utilized for performing other operations on work pieces wherever the same may be found to have utility.

In carrying out certain methods in the formation of elongated bodies or fibers of molten mineral materials such as glass through the use of centrifugal forces, the fiber-forming means involves the use of a hollow thin-walled spinner or rotor into which molten glass or other heat-softened material is delivered while the spinner or rotor is revolving at a comparatively high speed. A peripheral wall of the spinner is formed with comparatively small openings or orifices through which the glass or molten material is projected by centrifugal forces of rotation to form elongated bodies, primary filaments or fibers of the molten glass.

The machine or apparatus of the present invention is illustrated as especially adapted for drilling or forming a comparatively large number of small openings in the spinner or rotor wall. A typical form of spinner or work piece is shown in Figures 3, 4 and 5 of the drawings in position for the performance of drilling operations to form the openings in the spinner wall. The spinner or rotor 10 as illustrated is of hollow thin walled configuration having a peripheral wall 12 with frusto-conically shaped walls 14 and 16 welded or joined with the peripheral wall.

The frusto-conically shaped wall portions 14 and 16 terminate respectively in circular flanges 18 and 20 shown in Figure 4. The peripheral wall 12 is adapted to be drilled with several spaced rows of small circular openings through the use of the apparatus of the invention, there being several thousand openings in a spinner wall. Each opening is of a diameter of about one thirty-second of an inch. The hollow spinner or rotor is made of high temperature resistant metallic material such as stainless steel or rare metal alloys may be used such as platinum rhodium or platinum iridium.

The apparatus for performing operations such as drilling operations upon a work piece is inclusive of a plate or table 24 supported upon a frame 25, the latter including vertical corner posts or members 26 secured to base members 28, the base members being adapted to rest upon a floor or other support. Brackets 30 secured to the uprights or posts 26 support a second plate or shelf-like member 32.

Secured to the table 24 is a member 36 which forms a bearing for a shaft 38 which carries a plate or disk 40 mounted upon and secured to a tenon portion 42 formed on the upper end of the shaft 38. Secured to the disk or member 40 is an element or fixture 44 having a circular cylindrical portion 46 which is of a dimension to snugly yet slidably fit into the opening defined by the flange 20 of the spinner construction 10.

Interposed between the flange 20 and a flange 45 of element 44 is a removable collar or spacer 48. The collar 48 is of the required thickness to support the spinner 10 in a proper vertical position to accommodate the drilling of the work performing tools. When spinners of different heights are processed on the apparatus, a collar 48 of proper thickness may be used for the purpose.

A clamping member 50 preferably of rectangular shape, as shown in Figure 3, is formed with a portion 52 of a length to fit within the opening defined by the circular flange 18 of the rotor or spinner. A threaded stud 54 carried by the element or fixture 44 extends through an opening in the clamping member 50 and is adapted to receive a winged nut 56 which may be drawn up to secure the spinner to the element 44 in the manner shown in Figure 4.

The shaft 38 supports a gear 60 held in place by a nut 61 which is adapted to be rotated in step-by-step movements by mechanism hereinafter described for indexing or moving the spinner or rotor to successive positions during the carrying on of successive drilling operations.

In the embodiment of the apparatus illustrated in the drawings, the arrangement is inclusive of a plurality of work performing or drilling units 65. The drilling units are arranged in circumferentially spaced, radially arranged relation as shown in Figures 1 and 3. While there are nine work performing units illustrated in the apparatus shown in the drawings, it is to be understood that a greater or lesser number of units may be employed depending upon the type and size of the work piece or spinner upon which drilling or work operations are to be performed.

As illustrated the work performing units are substantially identical and are supported by means carried by the table 24 in a manner whereby each drill is disposed for operation in a plane vertically spaced from planes of movement of adjacent drills. Thus with nine drilling heads or units, the nine drills T are arranged in planes spaced vertically so that each drill will form an independent row of openings in the peripheral wall 12 of the spinner 10.

As shown in Figure 4, the units are supported upon blocks or members 68, each member 68 having its upper surface 69 arranged at a different heighth above the upper surface of the table 24 so as to position the axes of the drills in different planes.

Each of the blocks or members 68 is secured to the table or plate 24 by means of bolts 72. The plate or table 24 at the region of each block 68 is formed with parallel slots 74 through which extend the bolts 72, the bolts having threaded end portions which extend into threaded bores in the blocks 69. Each of the blocks 68 may be adjusted in a direction radially of the axis of the shaft 38 as the bolts 72, when released, may be slidably moved in the slots 74. When the bolts 72 are drawn up, the blocks 68 are fixedly secured in adjusted positions.

Secured to each of the blocks 68 is an upwardly extending member or support 76 formed with a circular cylindrical bore to receive a housing 78 of a work performing or drilling unit 65. Each of the members 76 is split at its upper region providing a space 82 which is bounded by boss portions 84 and 85 formed on member 76. The boss portions 84 and 85 are bored transversely to accommodate a locking or clamping member 87, the latter having a threaded extremity arranged to accommodate a nut 88. Each member 87 is formed with a shoulder 89 and a handle portion 90 as shown in Figure 3.

The bore or opening in each of the members 76 is dimensioned to snugly receive the housing 78 of a drilling unit. Through this arrangement, each drilling unit may be adjusted independently of the adjustment of its supporting block 68 and may be clamped or locked in adjusted position relative to its support 76 by rotating the handle 90 to draw the boss portions 84 and 85 toward each other by the engagement of the nut 88 and the shoulder 89 with the respective boss portions.

This form of support for the work performing or drilling unit 65 facilitates changing drills or tools and rapid replacement of a unit in the event that it becomes inoperative or in need of service or repair.

One of the work performing or drilling units is illustrated in longitudinal section in Figure 5. Each unit 65 includes an electrically energizable motor mounted upon a reciprocable member or sleeve 94 which is adapted to be moved or advanced toward work performing or drilling position by fluid pressure and returned to its initial position under the influence of resilient means.

As particularly shown in Figure 5, the housing 78 is of circular cylindrical configuration having a hollow interior defined by a cylindrical wall within which is slidably disposed the sleeve or member 94. The member has a piston portion 96 which is snugly yet slidably fitted within the interior bore in the housing 78 and a portion of lesser diameter which provides an annular chamber or region 98 which accommodates an expansive coil spring 100, the latter serving to retract the sleeve 94 and components carried thereby at the completion of a working performing or drilling operation.

An annularly shaped member 102 is threaded into an end region of the housing 78 and provides an abutment for one end zone of the spring 100 and a bearing or support for the sleeve 94. The other end region of the sleeve or member 94 is equipped with a metal end plate or head 106 secured in position by means of bolts 107. Secured to the end plate 106 is a piston member 108 having a longitudinally extending thin-walled portion 110 in snug engagement with the interior wall of the bore in the housing 78.

The piston member 108 may be formed of flexible packing material such as leather, reinforced rubber or other suitable material having flexible characteristics to snugly contact the interior wall of the housing 78 and prevent leakage of fluid from the chamber 112 existent between the central or body portion of the piston member 108 and an end wall portion 114 of the housing 78.

Mounted within an interior bore in the sleeve 94 is the field structure 116 of an electrically energizable motor 118, the field structure being positioned within the sleeve 94 by means of a shoulder or ledge 120. The motor 118 is inclusive of a shaft 122 equipped with an armature 124 and a commutator 125. A reduced end portion 126 of the shaft 122 is journalled in a suitable bearing or bushing 128 mounted upon an inwardly extending wall portion 130 formed on the sleeve 94.

Secured to the forward end of the sleeve 94 is an end wall or closure member 132. The member 132 is equipped with antifriction bearings 134 which journally support a portion 136 of the motor shaft 122. The end of the shaft portion 136 is equipped with a chuck or tool supporting means 138 which, in the embodiment illustrated, is fashioned to support a drill or other work performing tool T.

The chuck or tool support 138 is of the type employing movable jaws 140 which are manipulated into clamping engagement with a tool T by relative rotating movement of a sleeve 142 forming a part of the tool supporting arrangement. A shroud or closure member 146 formed of rubber or other suitable flexible material has a peripheral portion 147 engaging in a circumferential groove formed in the member 132, the inner region 148 of the shroud being secured to a shoulder portion 150 forming a part of the tool holder support 138.

The field structure 116 is secured in position within the sleeve 94 by means of bolts 154 extending through openings in an annular plate 156, an annular spacer member 158 being disposed between the motor field structure and the plate 156. The bolts 154 are threaded into openings formed in the ledge 120 of the sleeve 94.

The end plate or wall 132 is held in place by means of bolts 160, the threaded portions of which extend into openings formed in the annular member 156, a ring 162 forming a spacer between the annular member 156 and the end plate 132 for properly positioning the member 132. A fan or air impeller 164 is mounted on the motor shaft 122.

The housing 78 is provided with a passage 170 equipped with a filter 171, the passage communicating with a chamber 172 within the sleeve 94, the latter being in communication with the motor chamber by means of a passage 174. During rotation of the motor and the fan 164, the latter draws air through the filter 171, passage 170, chamber 172 and duct 174 into the region adjacent the motor 118, the fan exhausting the air through passages 166 in the end wall 132 and through openings 168 in the flexible shroud 146 thereby providing continuous movement of air to cool the motor.

Electrical connections 180 and 182 are provided for conducting current to the motor structure through a sleeve-like member or tube 184 secured to the plate 106. Current is conveyed to the armature through the medium of brushes 186, the current conductors 180 and 182 extending through a suitable channel in the wall portion 130.

The inner extremity of the motor shaft portion 126 is equipped with a rotor 190 of a pump structure 189 contained within a pumping chamber 192. The rotor 190 is provided with radial slots containing vanes 194 which cooperate with the walls of the chamber 192 to effect a pumping action.

As shown in Figure 7, the sleeve 94 is formed with a threaded bore arranged to receive the threaded end 198 of a tube or pipe 200 which supports a hollow member 202 filled with filter material 204, the pipe 200 extending through a slot 205 elongated lengthwise of the housing 78. The filter chamber 202 is provided with an end closure 206 having an air inlet passage 208. Rotatably supported on the member 206 is an air feed regulating means 210 in the form of a circular disk having circumferentially spaced openings 212 of different sizes as shown in Figure 8.

The disc 210 may be rotated to effect registration of one of the openings 212 with the air passage 208 and thus regulate the rate of admission of air to the air pump 189. The air passes through the filter material 204 through the pipe 200 and passages 214 and 216 into the pumping chamber 192.

The pump is provided with an outlet 218 which is in communication with a tube 220 for directing air under pressure into the chamber 112 for advancing the tool into engagement with the work.

Each of the work performing units is provided with means for releasing the fluid pressure in the chamber 112 at the completion of a work performing operation. As shown in Figure 5, the tubular member 184 carried by the end plate 106 has a threaded extremity 181 adapted to accommodate adjusting nuts 224. The portion 114 of the housing 78 is formed with projections 226 upon which a switch lever or plate 228 is fulcrumed or pivotally supported, the plate having a clearance opening to accommodate the tube 184.

A threaded member 230 carried by portion 114 extends through an opening in the plate 228. An expansive coil spring 232 is interposed between the head of the member 230 and the plate 228 biasing the plate in a clockwise direction as viewed in Figure 5.

The portion 114 is formed with a passage or bore 234 in which a rod 236 is reciprocably disposed. A plate valve 238 is secured to the portion 114 and has its distal end normally covering and closing the air exhaust port 234. The bore 234 is in communication with a passage 240 providing a vent to the atmosphere. The plate 228 supports a threaded abutment member 242 which may be adjusted and locked in position by means of a nut 244.

The end of the member 242 is disposed so as to engage the valve release rod 236 to effect a release of pressure in the chamber 112 when the plate 228 is moved in a lefthand direction about its fulcrum. A limit switch 248 is arranged in the path of movement of the plate 228. A bracket 250 secured to the distal end of the plate 228 is pivotally connected by means of a pin 252 with an armature 254 of a solenoid 256, the function of which will be hereinafter explained.

The actuation of the switch 248 by movement of the plate 228 at the completion of a drilling operation deenergizes a current relay to interrupt the flow of current to the motor 118 and to the solenoid 256.

A fluid pressure gauge 258 is threaded into a bore formed in the portion 114 of the housing 78, the gauge being in communication with the chamber 112 by means of passages 260 and 261.

A valve 263 which is biased to closed position by means of a spring serves to regulate and determine the pressure in chamber 112. A threaded member 264 is provided for regulating the spring pressure on the valve 263. A switch 266 supported upon the portion 114 is intercalated in the motor circuit, the switch being equipped with an operating lever 267 whereby the motor 118 may be operated independently of the automatic electrically energized motor control system. The components of the arrangement shown in Figure 5 adjacent the portion 114 are enclosed within a suitable cup-shaped casing 270 formed of sheet metal and telescoped with a shoulder portion of the housing end wall 114.

The means for indexing or moving the work to successive positions between each work performing operation and the fluid actuated arrangement therefor are illustrated in Figures 1 and 2. Mounted upon the shelf or supplemental table 32 is a housing 275. Suitably journalled for rotation in the housing is a shaft 277, an end region of the shaft extending above the housing supporting a drive pinion 279 which is in constant mesh with the gear 60 carried by the work supporting shaft 38 shown in Figure 4. The indexing mechanism contained in the housing 275 is of conventional construction and is described herein only to the extent of showing its association with other components of the arrangement.

Mounted upon the spindle or shaft 277 and disposed within the housing 275 is a notched indexing plate or disc 280. A member 282 is also supported by the shaft 277 and is equipped with a pivotally supported pawl 284 adapted and arranged for successive engagement in notches or recesses 286 formed in the indexing disc 280. The member 282 is associated with a cam plate (not shown) for elevating or lifting the pawl 284 out of engagement with a notch in the disc 280 in effecting an indexing operation. The apparatus embodies a holding dog or pawl (not shown) for preventing reverse rotation of the indexing plate.

The housing 275 is provided with two hollow cylinders 288 and 290 which are disposed in longitudinally spaced, aligned relation as shown in Figures 1 and 2. Slidably disposed in the cylinders 288 and 290 respectively are pistons 292 and 294, the pistons being secured to the ends of a connecting rod 296. The median region of the rod 296 is formed with rack teeth 298 and the member 282 journalled on the shaft 277 is formed with a toothed sector portion 300, the teeth of which are in mesh with the rack teeth 298 on the rod 296. The rod 296 is adapted to be reciprocated by fluid pressure alternately applied in the cylinders 288 and 290 to effect an indexing operation and resetting thereof.

In the embodiment illustrated, the indexing mechanism is arranged to be actuated by compressed air, but it is to be understood that the apparatus may be hydraulically actuated. The fluid actuated apparatus shown in Figures 1 and 2 is adapted to be connected to receive a supply of compressed air or other fluid under pressure from a reservoir (not shown) through a supply tube 305. The compressed air may be directed through a filter 306, a pressure regulator 307 and a lubricator 308.

The compressed air supply tube 305 is connected with valve mechanism contained in a housing 310 supported by one of the members 26 of the frame structure. The valve mechanism contained in the housing 310 is of the three-way type and is manipulated by a handle 312. The function of the valve mechanism in housing 310 is to shut off the air supply, to direct the same through a manually controlled valve for effecting manual indexing, or to direct the supply of compressed air to an electrically-controlled solenoid-actuated valve mechanism for establishing automatic indexing of the mechanism in timed synchronism with the operations of the drilling or work performing units.

The solenoid controlled valve mechanism for automatic operation of the indexing device is contained within a housing 314 and associated with the housing 314 are supplemental housings 316 and 318. The housing 316 encloses a solenoid actuator designated Sol 1 and the housing 318 encloses a solenoid actuator designated Sol 2. The housing 314 is formed with a chamber receiving fluid under pressure from the valve in housing 310 through a conduit or pipe 320.

The housing 314 contains multi-way valve mechanism actuated by the solenoid arrangements in housings 316 and 318. The valve controlled by Sol 1 is arranged, when open, to direct fluid under pressure through pipe 322, valve 323, and fitting 324 into the actuator cylinder 288. The valve in the housing 314 controlled by the solenoid Sol 2, when open, directs fluid under pressure through pipe 326, valve 327, and fitting 328 into the cylinder 290 of the indexing mechanism.

The arrangement includes manually controlled means supplementing the solenoid controlled automatic valve arrangement for directing compressed air to the cylinders 288 and 290. Mounted upon one of the frame members 26 is a valve housing 330 containing valve mechanism adapted to be controlled by manipulation of a control member 332. The valve housing 330 receives fluid under pressure from the supply valve housing 310 through a pipe 334.

The cylinder 288 is connected by means of fitting 324, manually operated valve 336 and pipe 337 with the valve housing 330. The cylinder 290 is connected with the valve housing 330 through fitting 328, manually operated valve 339, and pipe 340 with the valve housing 330. When automatic indexing is to be effected, the valves 336 and 339 are in closed position. When manually controlled actuation of the indexing mechanism is desired, the manually operated valves 323 and 327 are closed with the valves 336 and 339 in open position.

Means is incorporated in the indexing mechanism for cushioning the shock resulting from movement of the mechanism to a succeeding position. Secured to the housing 275 is a cylinder 342, the outer end of which is provided with a fitting 344 for regulating the size of a vent opening for the cylinder 342. A piston 343 is slidably mounted in the cylinder 342 and is connected with the indexing member or actuator plate 282. When the indexing mechanism is actuated by fluid under pressure applied to the cylinder 288, the speed of movement of the indexing plate 282 is retarded by the air cushion provided between the piston 343 and the end wall of the cylinder 342, the air from the cylinder being vented through the fitting 344 at a rate to avoid severe shock to the indexing mechanism as well as to prevent the actuator from overriding its successive indexed position. The housing 275 is formed with a boss portion 348 having a bore in which is slidably mounted a plunger 349. The plunger is adapted to engage a limit switch LS11 which is normally closed when the plunger 349 is properly seated in a notch in the indexing plate 280. If the plunger 349 is not properly seated, the plunger engages the limit switch LS11 preventing operation of the drilling units.

The housing 275 is adjustably supported on the supplemental table 32 in order to shift the position of the housing to permit use of indexing gears 60 and 279 of different sizes or diameters to change the circumferential spacing of the drilled openings in the work.

The member 351 is associated with the pawl carrying member 282 and is arranged to normally engage a microswitch or limit switch LS10 when the pawl is in registration with a notch in the actuator plate. The function and operation of switch LS10 is further explained in the description of the electrical circuits and control instrumentalities.

The apparatus includes an arrangement for flowing a coolant or cutting lubricant onto each of the tools or drill. Disposed adjacent the frame of the machine is a receptacle or reservoir 355 in which is immersed a fluid circulating pump 357 driven by an electrically energizable motor 358 mounted upon the cover 359 of the reservoir. A supply of the cutting liquid or coolant is contained in the reservoir 355.

The outlet of the pump is connected by means of a conduit 359' to a manually operated control valve 360 and through a conduit 361 with a distribution manifold or header 363.

A plurality of tubes 365 are connected with the manifold and convey the coolant to a ring-shaped distribution member or annulus 367 shown in Figure 1. Supported upon the annulus 367 are coolant conveying tubes 369, each having an outlet portion 370, there being an individual tube 369 for each drill or tool T to be supplied with coolant or cutting liquid.

As shown in Figure 1, there is provided a tube 365 for each tube 369 and communication between each pair of tubes 365 and 369 is established through a passage 372 formed in the distribution ring 367. The ring 367 is supported by brackets 374 secured to the table 24. A control valve 375 is interposed between each tube 365 and its connection with the manifold 363 for selectively controlling the flow of liquid to each drill or tool.

Secured to the member 36 is a circular coolant collector or drain pan 378 which is provided with a drain duct 380 connected with the reservoir 355. The coolant or cutting liquid falling from the drills is collected in the circular pan 378 and returned to the reservoir 355 through the duct 380.

In the operation of the coolant circulating system the pump 357, having an inlet beneath the level of the supply of liquid in the reservoir, conveys the liquid through the pipe 359, valve 360, pipe 361, and the manifold or header 363, the liquid flowing from the manifold through pipes 365, distributor 367 and tubes 369 onto the drills or tools through the outlets 370. The valves 375 may be manipulated in order to control the flow rate of liquid to each individual drill.

A splash guard 376 may be provided adjacent each drill as shown in Figure 5. Each guard or baffle is formed of sheet metal with a curved portion 377 disposed above the drill and ear portions having openings to receive the shaft portion 87 of the clamping means of a drilling unit whereby the guard is supported by shaft portion 87.

Figure 9 is a schematic diagram showing the electrical control instrumentalities and the circuits therefor. The circuit diagram of the motor and control circuit of one of the drilling units is illustrated at E1 in Figure 9. The block diagrams designated E2 through E9 are identical with the circuit designated E1 and hence these circuits have not been illustrated in detail other than to illustrate the interlocking relay arrangement.

With particular reference to the diagram of the motor unit designated E1, the current supply lines are indicated at L1 and L2. A variable control for regulating the speed of the motors of the drilling units is indicated at 380. Contacts of a current relay CR1-2 and CR1-3 are intercalated in the circuit of the motor 118 and the solenoid 256, the armature 254 of the solenoid being connected with the pivotally mounted plate 228 shown in Figure 5.

A limit switch LS-1 contained within the switch housing 248 shown in Figure 5 is mechanically actuated by lever 228 and is associated with the relay CR1 for interrupting the circuit of motor 118 and the solenoid 256 at the completion of a drilling operation of the unit.

Further description of the electrical control mechanisms and circuits will be had in connection with the description of the operation of a complete drilling or work performing cycle of the several units.

The position and status of the several components of the apparatus prior to initiating a drilling cycle is as follows: The motor 118 and associated components carried by the sleeve or member 94 of each of the drilling units 65 are in full retracted position with the tool or drill T of each drill head spaced from the peripheral wall 12 of the spinner or work piece to be drilled.

The switch control lever or member 228 shown in Figure 5 is in a position under the influence of the spring 232, holding the air exhaust valve 238 open.

The depth or extent of movement of the drill or tool T into the work piece is determined by adjusting the position of the stop nuts 224 on member 184.

The indexing mechanism shown in Figures 1 and 2 has not been actuated to move the work piece or spinner into a succeeding or indexed position for the next cycle of drilling operations as the index locking plunger 349 and the indexing or actuating pawl 284 are engaged in notches or recesses in the indexing plate 280. The limit switches LS10 and LS11 are in their normal positions.

The operations of the apparatus are automatic and occur in a manner herein described. The operation of each of the drilling or work performing units is identical and all units operate concomitantly. Hence, a description of the circuits of the drilling unit designated E1 will suffice.

In initiating the operation of the apparatus, the operator moves the switch component SW1 of switch 390 to automatic position and moves the switch 392 to automatic position. The operator then closes the master control switch 382 which energizes relay CR13 which is self-holding through contact CR13-1 and contact CR13-2 is also closed. The relays CR1-1 through CR9-1 are normally closed as shown in Figure 9 establishing a circuit through limit switch contact LS10-1 and a closed contact of a time delay relay TDR2 to energize time delay relay TDR1 to allow all of the drill units to move to retracted positions.

The energization of TDR1 energizes the solenoid Sol 1 contained in housing 316 to effect a movement of the valve mechanism contained in valve casing 314 (shown in Figures 1 and 2) directing fluid under pressure such as compressed air through the pipe 322 and into the cylinder 288. The fluid pressure acts on the piston 292 moving the piston rod 296 in a righthand direction as viewed in Figure 2. The rack teeth formed on the piston rod 296 move the member 282 carrying the indexing pawl 284 and is associated with the cam plate (not shown) for actuating or controlling the pawl to move the notched indexing plate 280 to a succeeding or indexed position.

The cam plate moves the indexing plate locking plunger 349 out of the notch or depression in which it is seated to permit the indexing plate to move to indexing position. The movement of the piston rod 296 performs the indexing operation as above described, which movement is transmitted through the spindle or shaft 277, pinion 279, gear 60 and the work or spinner supporting shaft 38 to move the spinner or work piece 10 through a small angular distance to a succeeding or indexed position in preparation for the performance of a cycle of drilling operations.

During movement of the indexing member 282, the piston 343 in the cylinder 342 compresses the air in the cylinder and provides an air cushion to prevent shock to the indexing apparatus or override thereof during an indexing movement. The air in the cylinder 342 escapes at a comparatively slow rate through a vent fitting 344 which may be adjusted to regulate the effectiveness of the air cushion.

When the indexing plate or table 280 reaches its full travel during an indexing cycle, contact LS10-1 opens and contacts LS10-2 closes, which action energizes solenoid Sol 2 contained in housing 318 to direct pressure fluid such as compressed air through tube 326 into the cylinder 290 to retract the piston rod 296, the member 282, and the indexing or actuating pawl 284 carried thereby. The time delay relay TDR2 is also energized, closing its holding circuit and locking TDR2 in the circuit.

The limit switch contact LS11-1 is actuated by the index or locking pin 349 moved out of locking position by the cam plate during the period of actuation of the member 282. During this period TDR2-1 is closed. The limit switch LS11-1 remains open until the table reaches indexed position, in which position the locking pin 349 moves into the adjacent notch of the indexing plate 280 and LS11-1 is then closed.

The limit switch LS10 acts as a bridge for the two phases of a complete cycle of operation of valve actuating solenoids Sol 1 and Sol 2. Sol 1 carries the indexing movement through the first half of the cycle and then actuates LS10 whereupon Sol 2 being then energized moves the indexing mechanism through the retracting phase of the cycle. The relay TDR2 has its own holding circuit.

When the limit switch LS11-1 is in closed position and TDR2-1 is in closed position, a circuit is completed to relays CR10, CR11 and CR12 which are activated to complete circuits through the relays for the individual drilling units designated CR1 through CR9. Each of the relays CR10, CR11 and CR12 takes care of a group of three relays each of relays CR1 through CR9. The energization of these relays opens the contacts CR1-1 through CR9-1 which action deenergizes the indexing circuit.

The contact TDR2-1 remains closed for a short instant after the energization of TDR2 and the time delay occurs after current flow is interrupted to TDR2. Thus relays CR10, CR11 and CR12 are energized only for a short time after the relays CR1 through CRo are energized.

The limit switches LS1 through LS9 are activated by solenoid 256 when the contact CR1-2 of each relay closes to energize a solenoid 256 at the same time that contact CR1-3 of each relay is closed to energize a motor 118. Relay contact CR10-1 and the equivalent contacts of the relays for each of the nine units are dropped out of the circuit by reason of the time delay having expired on the relay TDR2. The relays CR1 and CR9 are, however, held energized through limit switches LS1 through LS9, and the contacts CR1-2 and CR1-3 and the equivalent relay contacts for each unit are held in closed position through limit switches LS1 through LS9 holding the relays CR1 through CR9 energized. The energization of the coil of current relay CR1 closes contact CR1-3 starting the motor 118 of the drilling unit and closes the contact CR1-2 energizing the solenoid 256 to move the switch member 228 to the position shown in Figure 5 in which position the spring 232 is compressed and is maintained in compressed condition as long as solenoid 256 is energized. The motor shaft 122, the drill T and the rotor of the air pressure pump 190 are rotated upon the closing of the contact CR1-3. The rotating vanes 194 of the air pump withdraw air through the filter chamber 202 compressing the air which is delivered through the passage 218 into the piston chamber 112 building up pressure in the piston chamber. The rate of flow of air admitted to the air pump is regulated by adjusting the position of the valve disk 210 to bring an opening 212 of the proper size into registration with the air inlet passage 208 formed in the filter cover 206 shown in Figure 7. As the air or fluid pressure builds up in the piston chamber 112 the sleeve or piston member 94 moves forwardly engaging the drill or tool T with the wall 12 of the spinner or work piece 10.

The fluid pressure, by reason of the rotation of the pump rotor 190 continues to build up in chamber 112 forcing the tool T through the spinner wall 12. When the drill has completed its operation upon the spinner or work piece and has been moved a distance equal to the distance between the switch lever or member 228 and the adjacent abutment nut 224, the abutment nut 224 moving forwardly with the sleeve 94 engages and swings the switch member 228 in a clockwise direction about its fulcrum as viewed in Figure 5. As the switch lever 228 swings from its position shown in Figure 5 it engages the limit switch LS1 contained in the housing 248 shown in Figure 5 which deenergizes current relay CR1 and instantly opens the circuits to the motor 118 and the solenoid 256.

During swinging movement of the lever member 228 the abutment screw 242 engages the rod 236 and opens the exhaust valve 238, thus venting the chamber 112 through the vent opening 240 to the atmosphere whereby the pressure in chamber 112 is reduced to atmospheric pressure. As the forward movement of the sleeve 94 has compressed the coil spring 100, the expansive pressure of the spring returns the sleeve 94, the drill T and associated parts of the drilling unit carried thereby to full retracted position shown in Figure 5.

The same operations are being carried on simultaneously of all of the other drilling units and circuits of the block diagrams designated E2 through E9.

After each current relay associated with a drilling unit is deenergized at the completion of a drilling operation by the opening of limit switches LS-1 through LS-9, the contacts CR1-1 through CR9-1 shown in Figure 9 are closed and a circuit is again established energizing time delay relay TDR1 which in turn initiates the next work indexing cycle by energizing the valve operating solenoid Sol 1. In this manner the next cycle of operations is automatically initiated without any action on the part of the operator.

The motor 358 is energized continuously during drilling operations to establish a continuous rotation of the pump 357 to direct continuous streams of coolant onto the drills or tools T in order to lubricate the tools as well as to convey the heat of friction away from the drills.

It will be noted from the foregoing that a particular feature of the invention resides in the electrical interlock of the relays and limit switches whereby indexing movements of the indexing mechanism cannot occur until the drilling operations of all of the drilling units are completed and units withdrawn from engagement with the work.

It is apparent that, within the scope of the invention, modifications and different arrangements may be made other than is herein disclosed, and the present disclosure is illustrative merely, the invention comprehending all variations thereof.

I claim:

1. Apparatus for performing multiple and successive operations upon a work piece including, in combination, an indexible work piece supporting fixture, a support, a plurality of tool supporting units arranged adjacent the fixture and mounted on said support, fluid actuated means for indexing the fixture, air cushion means for retarding movement of the fixture and work piece to indexed positions, electrical control means for the indexing means, a tool carried by each of the units, said tools being arranged for engagement with the work piece in different planes relative to the fixture, electrically controlled means individual to each unit for moving the tools concomitantly into engagement with the work, means individual to each unit operable to withdraw the tool from the work piece at the completion of its work performing operation, and means including interlocking circuits and relays connecting the control of the indexing means and the electrical controls of each of said units whereby the indexing means is actuated after all of the tools have completed a cycle of operations upon the work piece.

2. Apparatus for performing multiple and successive drilling operations upon a work piece including, in combination, a work piece supporting fixture indexible about an axis, a support, a plurality of drill supporting units radially arranged about the axis of the fixture mounted on said support, an electrically controlled, fluid actuated indexing means for moving the fixture, an air chamber for retarding movement of the fixture and work piece to indexed positions, adjustable vent means for the air chamber for regulating the rate of movement of the fixture and work piece, a drill carried by each of the units, each of said drills being arranged for simultaneous engagement with the work piece in different planes, electrically controlled, fluid actuated means individual to each unit for moving the drills concomitantly into engagement with the work, means individual to each unit operable to withdraw the tool from the work piece at the completion of a drilling operation, and interlocking circuits and relays connecting the electrical control of the indexing means and the electrical controls of each of said drilling units whereby the indexing means is automatically actuated after all of the drills have completed a cycle of operations upon the work piece.

3. A machine for drilling openings in a wall of a hollow workpiece including, in combination, a frame, a plate mounted upon the frame, a work-holding fixture journaled for rotation and indexible to successive positions, a plurality of drilling units supported by the plate in circumferentially spaced relation at different heights relative to the plate whereby each drill engages the work piece in a different plane for forming multiple rows of openings, electrically controlled means for indexing the work piece to successive positions, fluid means arranged to cushion the shock of movement of the work piece and indexing means to succeeding positions means individual to each drilling unit for advancing the drill carried thereby into engagement with the work piece, a second means individual to each unit for retracting the drill from a work piece, a motor in each unit for rotating a drill, a circuit controlling relay for each motor, circuits interlocking the relays with the electrical controls of the indexing means whereby said indexing means performs an indexing operation after the completion of a cycle of drilling operations of all of the drilling units.

References Cited in the file of this patent

UNITED STATES PATENTS

| | | |
|---|---|---|
| 1,382,433 | McCarty | June 21, 1921 |
| 1,967,689 | Schauer et al. | July 24, 1934 |
| 1,975,006 | Kingsbury et al. | Sept. 25, 1934 |
| 2,049,444 | Hirvonen | Aug. 4, 1936 |
| 2,051,720 | Kingsbury | Aug. 18, 1936 |
| 2,358,389 | Ewart et al. | Sept. 19, 1944 |
| 2,381,039 | Churchill | Aug. 7, 1945 |
| 2,643,555 | Steibel | June 30, 1953 |
| 2,684,017 | Schafer | July 20, 1954 |
| 2,779,220 | Dunn et al. | Jan. 29, 1957 |